Patented Apr. 20, 1954

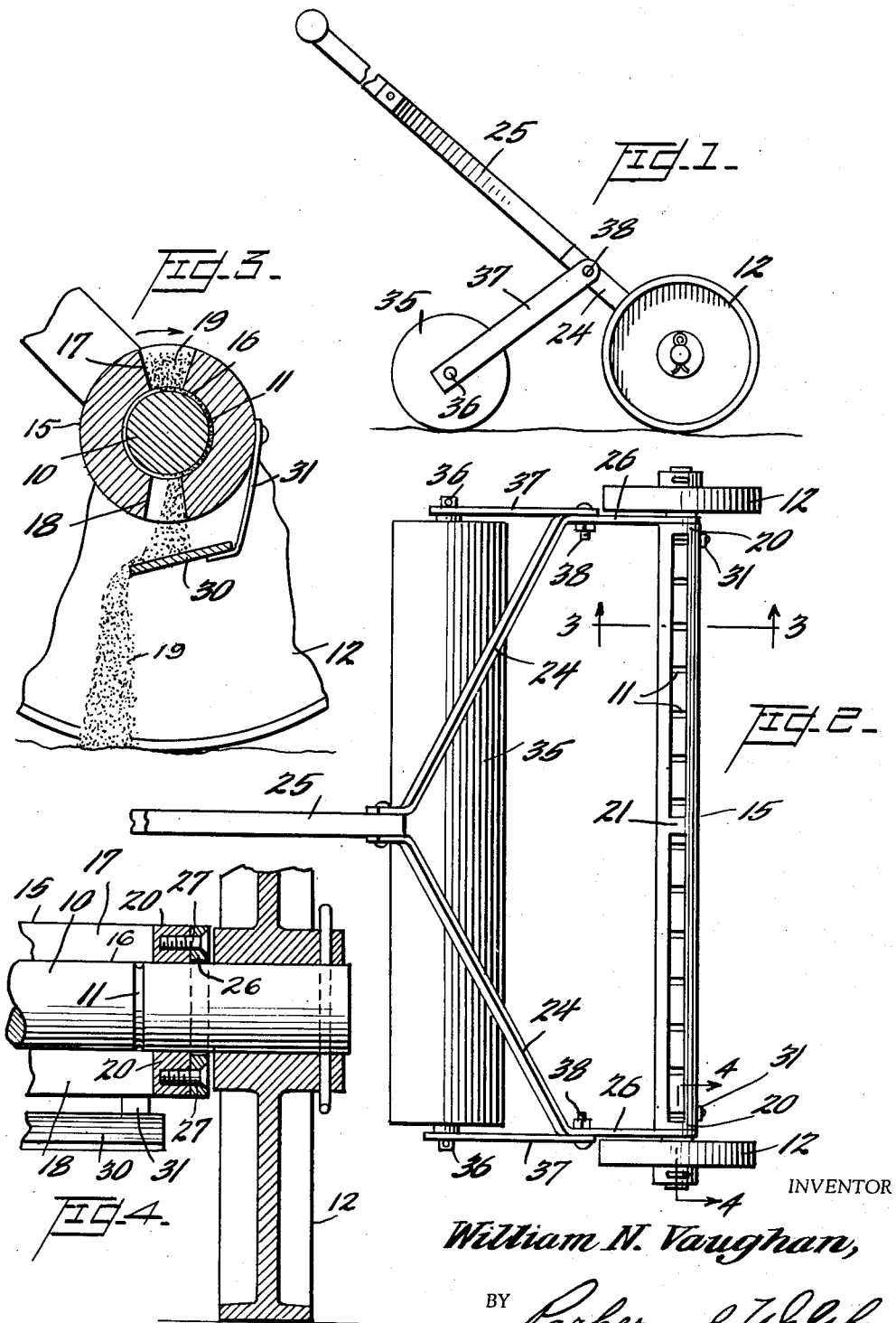

2,676,024

UNITED STATES PATENT OFFICE 2,676,024

TOBACCO SEED SOWER

William N. Vaughan, Nash County, N. C.

Application March 22, 1951, Serial No. 216,927

3 Claims. (Cl. 275—14)

This invention relates to a seed sowing device, and more particularly to a device for sowing extremely fine seeds, such as tobacco seeds.

In the sowing of tobacco seed in beds, it is highly desirable to scatter the seeds uniformly. This is extremely difficult because of the fact that the seeds are exceptionally small. A single ounce of tobacco seeds contains approximately three hundred thousand seeds. This amount is sufficient to sow from three hundred to four hundred square yards of tobacco bed. Many beds of tobacco plants are destroyed every year by blue mold, which attacks the plants to a greater extent where they are planted thickly than where the plants are somewhat more scattered. For this reason, it is particularly desirable to scatter the seeds uniformly in a bed, and as stated, this is quite difficult because of the fine size of the seeds.

An important object of the present invention is to provide a simple and highly efficient device for sowing tobacco seeds where the sowing takes place uniformly and wherein the mechanism employed does not mash or destroy any of the seeds, which would take place with conventional seed sowers.

A further object is to provide a novel and highly simplified type of device for sowing tobacco seeds wherein the seeds are fed in uniformly spaced small streams to a "spatter plate" which so divides the seed streams as to scatter the seeds uniformly over the bed.

A further object is to provide such a device wherein a roller is embodied with the sowing device to roll the ground after the seeds have been dropped to cause the seeds to take firm hold in the ground to prevent their being dislodged by wind and rain, thus assisting the properly sown seeds in sprouting.

A further object is to provide such a device which is supported on wheels for rolling movement over the bed and wherein the wheels are connected by an axle which serves as part of the means for feeding the seeds from a hopper to the "spatter plate."

Other objects and advantages of the present invention will become apparent during the course of the following description.

In the drawing, I have shown one embodiment of the invention. In this showing,

Figure 1 is a side elevation of the complete device,

Figure 2 is a plan view of the same, part of the handle being broken away,

Figure 3 is an enlarged fragmentary sectional view on line 3—3 of Figure 2, and

Figure 4 is a similar view on line 4—4 of Figure 2.

Referring to Figures 1 and 2, the sower is illustrated as comprising a bar 10 of steel or the like machined to a smooth surface and provided at spaced points therealong with relatively narrow shallow grooves 11 for a purpose to be described. The bar 10 forms one element of a seed feeding device as further described below, and it serves also as an axle connected to wheels 12 at opposite sides of the device, these wheels supporting the device for movement over the seed bed.

A tubular body 15 surrounds the bar or axle 10 between the ends thereof as shown in Figure 2. This body may be formed of cast iron or steel or any other suitable material and is bored longitudinally as at 16 to receive the bar 10. Particular attention is invited to the fact that the bar 10 and bore 16 are smoothly finished and have a close bearing fit with each other for a purpose to be described.

The body 15 is provided at the top and bottom thereof respectively with relatively wide slots 17 and 18, the former of which provides a hopper for seeds 19 (Figure 3), while the opening or slot 18 provides for the discharge of seeds passing from the hopper 17 downwardly through the grooves 11, as further described below. The continuity of each of the slots 17 and 18 is interrupted at the ends thereof by integral connecting webs 20 and centrally thereof by a similar connecting web 21, thus fixing the sides of the body 15 relative to each other.

A handle frame of flat bar material indicated by the numeral 24 is connected to a suitable handle 25 and has forward parallel portions 26 connected to the ends of the body 15 by suitable screws 27 (Figure 4). Accordingly, it will be apparent that the device may be pushed over the ground by the handle 25, supported by the wheels 12.

A "spatter plate" 30 is arranged beneath the discharge opening or slot 18 and is inclined downwardly and rearwardly as shown in Figure 3. This plate is supported by arms 31 connected at their upper ends to the body 15.

A roller 35 follows behind the sowing device and is spaced therefrom as shown in Figures 1 and 2. The roller has an axle 36 to which are connected the rear lower ends of arms 37 having their forward ends pivoted as at 38 to the handle frame 24. Accordingly, the roller 35 is adapted to swing freely relative to the handle structure to remain in contact with the ground.

Operation

The ground is prepared to form a bed to receive the seed. The desired quantity of seed is placed in the hopper 17 with the device at one end of the bed, whereupon the operator pushes the device forwardly or to the right, as viewed in Figure 1. The very fine tobacco seed will flow in small streams around the grooves 11, and particular attention is invited to the fact that these grooves are preferably circumferential to eliminate any shearing of the fine tobacco seeds against the bottom forward edge of the hopper 17. Of course, the bar or axle 10 rotates with the wheels 12, this rotation being clockwise, as viewed in Figure 3, and the rotation of the bar assists in feeding seeds around the grooves 11. Attention also is invited to the fact that the bar 10 has snug bearing engagement with the bore 16, thus preventing the wedging of any of the fine seeds between the bore 16 and the bar 10 intermediate the grooves 11 thereof.

The seeds flowing downwardly in streams around the grooves 11 drop through the opening 18 and strike against the "spatter plate" 30. The streams of seeds falling through the opening 18 are relatively uniform and the long opening 18 permits the seeds of each stream to start to separate as soon as they are free of the groove 11. The seeds dropping on the plate 30 are further divided and spread longitudinally of the plate 30; and in actual practice, it has been found that a highly uniform distribution of seeds over the bed is accomplished without any appreciable damaging of the seeds passing through the device.

As previously stated, it is extremely difficult to handle seeds as fine as tobacco seeds in a mechanical device without mashing or damaging a substantial percentage of the seeds, and it is difficult to secure a uniform distribution of the undamaged seeds. The present device performs its functions perfectly, and a proper and uniform distribution of seeds over the prepared bed is performed by the mere pushing of the device over the ground at a fair speed. The roller 35 follows the sowing device and rolls the seeds into the ground, giving them a firm hold on the ground by impacting the ground relative to the seeds. Thus the seeds are not only uniformly distributed, but they are firmly implanted in the ground and are thus prevented from being dislodged by wind and rain. Accordingly, the seeds germinate efficiently and the young plants grow well and in a healthy condition. The seeds are not bunched to render them more susceptible to attacks by blue mold, and yet the seeds are planted as thickly per square yard as is recommended by authorities in this field.

I claim:

1. In a fine-seed sower, a horizontal cylinder having an elongated seed feeding opening in its top extending longitudinally of the cylinder over a substantial portion of its length, and an elongated seed discharging opening in the bottom thereof, a rod rotatable in said cylinder in snug bearing engagement therewith, said rod being provided with a plurality of identical relatively narrow, shallow continuous circumferential grooves spaced from each other along the rod and communicating with said openings, and means beneath said cylinder for scattering seed dropping through said discharge opening.

2. A fine-seed sower comprising an elongated relatively thick cylinder having an axial bore therethrough, said cylinder being provided in the top thereof with an elongated slot extending into said bore to constitute a seed hopper, and being provided beneath said bore with an elongated discharge opening, and a rotatable rod in said bore in snug bearing engagement therewith, said rod being provided with a plurality of longitudinally spaced continuous circumferential grooves communicating with said elongated slot and discharge opening.

3. A fine-seed sower comprising an elongated relatively thick cylinder having an axial bore therethrough, said cylinder being provided in the top thereof with an elongated slot extending longitudinally of the cylinder bore and into said bore to constitute a seed hopper, and being provided beneath said bore with an elongated discharge opening, a rotatable rod in said bore in snug bearing engagement therewith, said rod being provided with a plurality of longitudinally spaced continuous circumferential grooves communicating with said slot and discharge opening, and supporting wheels at the ends of said cylinder. said wheels being mounted on the ends of said rod whereby the latter constitutes an axle for said wheels and said wheels rotate said rod during movement of the device over the ground.

References Cited in the file of this patent

UNITED STATES PATENTS

| Number | Name | Date |
|---|---|---|
| 78,396 | Sanderson et al. | May 26, 1868 |
| 114,047 | Sargent | Apr. 25, 1871 |
| 150,199 | Smith | Apr. 28, 1874 |
| 273,146 | Powell | Feb. 27, 1883 |
| 1,912,988 | Masters | June 6, 1933 |
| 2,065,717 | Marlsdale | Dec. 29, 1936 |
| 2,113,503 | Blakesley | Apr. 5, 1938 |
| 2,541,867 | Givenrod | Feb. 13, 1951 |
| 2,569,421 | Larson | Sept. 25, 1951 |

FOREIGN PATENTS

| Number | Country | Date |
|---|---|---|
| 243,268 | Switzerland | Dec. 16, 1946 |